Figure 1:
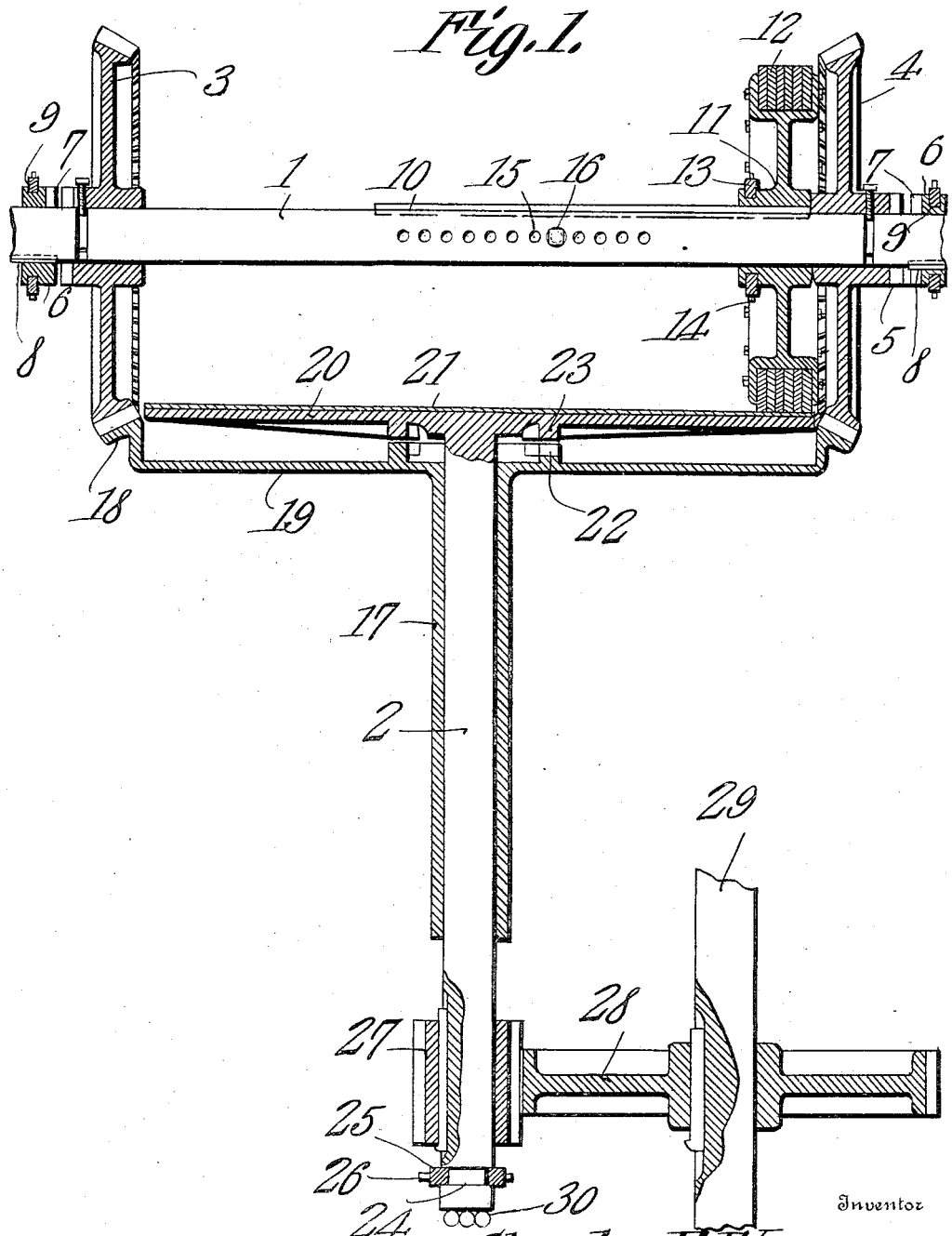

C. E. WYMAN.
TRANSMISSION GEARING.
APPLICATION FILED AUG. 10, 1909.

965,977.

Patented Aug. 2, 1910.

2 SHEETS—SHEET 1.

Witnesses
E. J. Stewart
F. T. Chapman

Inventor
Charles E. Wyman.
By C. A. Snow & Co.
Attorneys

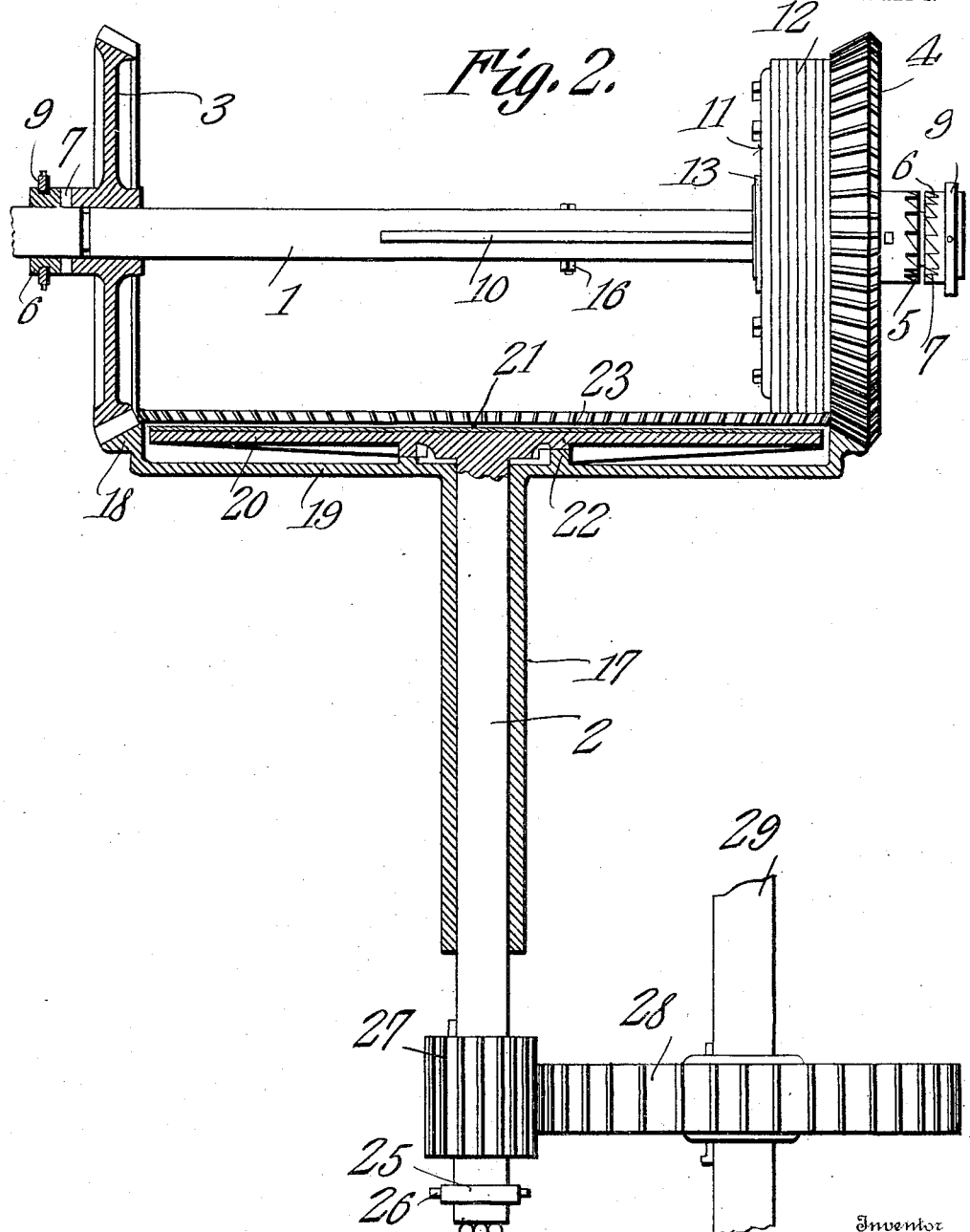

UNITED STATES PATENT OFFICE.

CHARLES E. WYMAN, OF PEKIN, INDIANA.

TRANSMISSION-GEARING.

965,977. Specification of Letters Patent. Patented Aug. 2, 1910.

Application filed August 10, 1909. Serial No. 512,268.

*To all whom it may concern:*

Be it known that I, CHARLES E. WYMAN, a citizen of the United States, residing at Pekin, in the county of Washington and State of Indiana, have invented a new and useful Transmission-Gearing, of which the following is a specification.

This invention has reference to improvements in transmission gearing where it is desirable to vary the rate of transmission and also to transmit power in either direction of the parts at slow speed.

In accordance with the present invention there is provided a power shaft and a driven shaft carrying a friction disk to which power is transmitted to the driven shaft frictionally. The driven shaft is capable of movement in a direction to carry the friction disk into and out of engagement with the friction wheel on the power shaft and provision is made for moving the friction wheel on the power shaft to and from the axis of rotation of the driven shaft to vary the speed of drive. Furthermore the driven shaft is surrounded by a hollow shaft or sleeve carrying a gear wheel into engagement with which may be brought gear wheels or pinions on the drive shaft so that the hollow shaft may be coupled up with the drive shaft for rotation in either direction at will.

Provision is also made for coupling the driven shaft and the hollow shaft together for simultaneous rotation so that power imparted to the hollow shaft by the gear connection may be transmitted through the driven shaft to the machinery to be actuated.

The invention will be best understood from a consideration of the following detailed description taken in connection with the accompanying drawings forming a part of this specification, in which drawings—

Figure 1 is an axial section through the structure showing the shaft in elevation. Fig. 2 is a plan view of the device with parts in section and showing a different phase of operation than Fig. 1.

Referring to the drawings, there is shown a drive shaft 1 and a driven shaft 2, these two shafts being arranged at right angles one to the other in the particular structure shown in the drawings.

Mounted upon the shaft 1 in spaced relation are two beveled gear wheels 3 and 4, each capable of turning loosely on the shaft, but these gear wheels are held against movement longitudinal of the shaft. Each gear wheel has its hub formed with teeth 5 and a sleeve 6 with corresponding teeth 7 is movable longitudinally of the shaft 1 but is constrained to rotate therewith by a spline 8, there being a sleeve 6 in operative relation to each gear wheel 3. The sleeve 6 has a ring 9 applied thereto for the reception of the yoke end of a suitable manipulating lever so that the sleeve may be moved with its teeth 7 into engagement with the teeth 5 on the hub of the respective gear wheels 3 or 4 or be moved out of engagement therewith. The clutch mechanism shown in the drawings is to be taken as illustrative rather than as showing a mandatory form of clutch since any suitable clutch mechanism for coupling the gear wheels to the shaft 1 or uncoupling them therefrom may be used in connection with the other mechanisms to be described.

The shaft 1 between the gear wheels 3 and 4 is provided with a spline 10 and mounted on the shaft is a friction wheel 11 constrained to rotate with the shaft by the spline 10 but free to be moved longitudinally of the shaft within the range of said spline. This friction wheel 11 is provided with a rim 12 of suitable friction material and the hub of this friction wheel is formed with a circumferential groove in which is lodged a ring 13 provided with diametrically opposite pins 14 for the application of the yoke end of a manipulating lever such as is commonly used for shifting structures such as the friction wheel illustrated. The shaft 1 is provided with a series of perforations 15 arranged longitudinally of the shaft and designed to receive a bolt 16 so that the limit of movement of the friction wheel 11 toward the axis of the driven shaft 2 may be determined by the position of the bolt 16 with reference to any one of the perforations 15 of the series thereof.

Mounted on the driven shaft 2 is a sleeve 17 terminating at one end in a bevel gear 18 intermeshed with the gear wheels 3 and 4, these gear wheels meshing with the bevel gear at diametrically opposite points on the latter. The outer face of the web 19 of the bevel gear is recessed to form a chamber in which may move a disk 20 at the corresponding end of the driven shaft 2, this disk being provided with a friction face 21 adapted to be engaged by the rim 12 of the friction wheel 11 so that when so engaged the rotation of the friction wheel 11 will impart rotary movement to the disk 20 and through the same to the shaft 2 at a speed determined by the initial speed of the drive or power shaft 1 and the relative position of the friction wheel 11 to the axis of rotation of the disk 20.

Formed on the face of the web 19 toward the shaft 1 is an annular series of teeth or lugs 22 and formed on the matching face of the disk 20 is an annular series of like teeth or lugs 23. These two series of teeth or lugs are so arranged as to intermesh when the disk 20 is brought into close relation with the web 19.

The end of the shaft 2 remote from the disk 20 is formed with an annular groove 24 in which is seated a ring 25 provided with diametrically opposite pins 26 to receive the yoke end of a suitable manipulating lever so that the shaft 2 may be moved in the direction of its longitudinal axis.

Keyed on the shaft 2 near the end remote from the disk 20 is a pinion 27. Meshing with the pinion 27 is a gear wheel 28 on a shaft 29 which may constitute the shaft leading directly to the work, the driven shaft 2 being an intermediate shaft. Since the shaft 2 is designed to have a limited longitudinal movement the pinion 27 is made long enough to accommodate this movement without being disconnected with the gear wheel 28.

The transmission gearing has a wide range of movement and may be employed on automobiles, motor cars, motor boats, or in any other relation where variable speed is desired.

Let it be assumed that the shaft 1 is being driven by a prime mover at constant or substantially constant speed and that the shaft 2 is withdrawn until the disk 20 is in its closest relation to the web 19 with the teeth 22 and 23 intermeshing. Under these conditions the shaft 1 is rotating but the shaft 2 is quiet. Suppose now that it is desired to drive the shaft 2 and from this shaft the shaft 29 at a slow speed. Then one of the gear wheels 3 or 4, depending upon the desired direction of rotation of the shaft 2 is clutched to the shaft 1 by the movement of the clutch mechanism. The gear wheel 3 or 4 now begins to rotate and the rotative movement is transmitted to the bevel gear 18. The rotative movement of the bevel gear 18 and web 19 is transmitted through the teeth or lugs 22 to the teeth or lugs 23 and the disk 20 participates in the movement of the bevel gear thus imparting to the shaft 2 a rotation having a speed depending upon the speed of the drive or power shaft 1 and the relation of the gear 3 or 4 to the gear 18. If rotation in the opposite direction is desired then the gear 3 or 4 is disconnected from its clutch and the other gear is clutched to the shaft 1 thus reversing the direction of rotation of the shaft 2 and the parts connected therewith. Under these circumstances the active face of the disk 20 is out of contact with the friction wheel 12 and the latter may rotate with the shaft 1 freely. Suppose that a greater speed of rotation is desired than can be obtained through the gears 3 or 4 and the gear 18. Then the shaft 2 is moved longitudinally until the teeth 23 are disengaged from the teeth 22 and the active face 21 of the disk 20 is brought into engagement with the rim 12 of the friction wheel 11, the degree of frictional engagement depending upon the force applied to the shaft 2 to move it against the active face of the wheel 11.

Since the frictional engagement between the friction wheel 11 and the disk 20 may require the exertion of considerable force, more than can conveniently be applied through the ring or collar 25, a thrust bearing may be provided for the end of the shaft 2 remote from the disk 20 so that the desired force may be applied. This thrust bearing is illustratively indicated by a series of balls 30 forming an antifriction bearing at this point. Any of the well known means of applying force to the shaft 2 to maintain the disk 20 in frictional engagement with the friction wheel 11 may be employed and as such means are well known it is not deemed necessary to illustrate them in the drawings.

Since the distance between the axis of the shaft 2 and the bearing point of the wheel 11 with the disk 20 is less than the distance between the axis of the shaft 2 and the point of engagement with the gear wheels 3 or 4 and the gear 18, the rotative movement imparted to the shaft 2 will have a higher speed than that imparted to the shaft 2 by either gear wheel 3 or 4. To increase the speed of rotation of the shaft 2 without increasing the speed of rotation of the power shaft 1, the friction wheel 11 is moved toward the axis of the shaft 2 to the desired extent and this movement may be restricted by the position of the bolt or stop 16, it being understood that an ordinary set screw may replace the bolt 16. Any degree of speed of rotation may be obtained by moving the friction wheel 11 toward or from the axis of rotation of the shaft 2, within the limits of the machine and consequently where a comparatively high and variable speed is desired the friction side of the structure will be employed, but where a slow speed is desired as on starting or hill climbing or when a heavy load is to be carried, or in backing, the friction side of the structure is put out of commission and the gear wheels 3 or 4 as desired are coupled to the power shaft 1 thus transmitting the motion therefrom through the wheel 18 to the said shaft 2.

While the shaft 1 has been designated the power or drive shaft and the shaft 2, the driven shaft, it will be understood that these relations may be reversed, but for convenience of description the shaft 1 may be considered as the drive shaft and the shaft 2 as the driven shaft without however limiting the invention to such arrangement.

It will be observed that the bearings for the several shafts are not shown in the drawings. Since any type of bearing may be employed that is adapted to the structure shown and many types of bearings are known which are so adapted, it is not deemed necessary to show such bearings in the drawings.

What is claimed is:

1. In a transmission gearing, a drive shaft, a driven shaft, a gear wheel mounted on the driven shaft and capable of rotating independently thereof, gear wheels on the drive shaft in mesh with the gear wheel on the driven shaft and capable of rotating independently of the drive shaft, means for coupling the gear wheels independently to the drive shaft, a friction wheel on the drive shaft and capable of being moved longitudinally thereof, a friction disk carried by the driven shaft, and means positively coupling the friction disk to the gear wheel mounted on the driven shaft.

2. In transmission gearing, a drive shaft, a friction wheel mounted thereon and capable of moving longitudinally on said shaft, means for constraining the friction wheel to rotate with the shaft in any position of adjustment thereof, means carried by the shaft for determining the extent of movement of the friction wheel along said shaft in one direction and a driven shaft having friction means coacting with the friction wheel on the drive shaft.

3. In transmission gearing, a drive shaft, a friction wheel thereon, a driven shaft, a friction disk thereon provided on the face remote from its active face with a series of teeth or projections, said driven shaft being capable of longitudinal movement, a sleeve on said driven shaft, a bevel gear on the sleeve, said bevel gear having teeth or projections matching those on the friction disk, gear wheels loosely mounted on the drive shaft and meshing with the bevel gear, and means for coupling either of the gear wheels on the drive shaft to said drive shaft at will.

In testimony that I claim the foregoing as my own, I have hereto affixed my signature in the presence of two witnesses.

CHARLES E. WYMAN.

Witnesses:
  D. M. ALLEN,
  ED. A. HELLER.